Patented Feb. 12, 1946

2,394,952

UNITED STATES PATENT OFFICE 2,394,952

BUTADIENE-STYRENE ELASTOMERS

John R. Vincent, Wilmington, Del., assignor to E. I. du Pont de Nemours & Company, Wilmington, Del., a corporation of Delaware No Drawing. Application April 29, 1944,
Serial No. 533,399

6 Claims. (Cl. 260—36)

This invention relates to a method of improving the processability of butadiene-styrene elastomers, and has for its object the addition of materials to the butadiene-styrene elastomers whereby they can be more readily and quickly processed with the machinery ordinarily employed in the processing of natural rubber.

In attempting to replace natural rubber with the synthetic rubbers such as Buna S, GR–S, Hycar OS 10, Hycar OS 20, etc., which are butadiene-styrene elastomers, one of the major problems has been the working of such synthetic elastomers on the usual rubber working machinery. The working of such synthetic rubbers, even where it is possible to carry it out on the usual rubber machinery, requires excessive time to effect the break-down or to properly compound the same with the necessary compounding materials. Where long periods of working are required to effect the desired result, the volume output per unit of equipment is necessarily low, and the power consumption unduly high.

I have found that the processability of the butadiene-styrene elastomers can be greatly improved if there is incorporated therewith from 0.05% to 10% of a polyvalent metal salt of a terpene mercaptan, based on the weight of the elastomer. The addition of a small amount of such polyvalent metal salt of the terpene mercaptan of the butadiene-styrene elastomer has been found to result in a material decrease in the time of milling required to break down the elastomer to a condition satisfactory for the introduction of compounding ingredients. It also results in a substantial decrease in the time required for introducing the compounding ingredients into such elastomer.

Illustrative examples of the salts that are effective in reducing the milling time of a butadiene-styrene elastomer are shown in the table below. In this case, the elastomer used was GR–S (the butadiene-styrene rubber made under the government's synthetic rubber program). The data is for various metal salts of pinene mercaptan.

| Metal | Amount of salt used | Lot of GR-S | | Percent reduction in milling time |
|---|---|---|---|---|
| | | Manufacturer | Lot No. | |
| | Percent | | | |
| Zn | 4 | A | 1 | 43 |
| Pb | 4 | A | 1 | 31 |
| Hg(ic) | 4 | A | 1 | 22 |
| Ni | 4 | A | 1 | 34 |

The data was obtained using a laboratory rubber mill having rolls 6 inches long and 2 inches in diameter, running at the same speed. The rolls were set 0.030 inch apart and were kept at 70°±1° C. during the testing. A 50 g. portion of the elastomer was milled until a band free of holes, for at least the time required for one revolution of the mill rolls, was obtained. The time required for this was noted. The run was then repeated with a 50 g. portion of the identical elastomer, and the salt to be tested was added to the elastomer, as quickly as possible, at the beginning of the run. The time to produce a band free of holes was again noted. By comparing the results of such a pair of runs, the improvement in milling time provided by the added salt can be expressed in terms of percentage reduction in milling time.

These data show that these salts cause a marked reduction in the milling time of GR–S. Other metals and other terpene mercaptans can also be used. For example, 4% of zinc isofenchyl mercaptide results in a 38% reduction in the milling of a sample of GR–S from manufacturer B, lot 2. GR–S from manufacturer C, lot 2, was reduced 38% in milling time by 4% of copper camphene mercaptide and 33% by 4% of copper beta-pinene mercaptide.

These results show that a very large saving in time and in power may be obtained by the use of such salts. Further savings in time and power are obtained during the compounding operation, particularly during the incorporation of a carbon black into the elastomer.

The terpene mercaptans, from which these salts may be made, are obtained by the reaction of the terpene with hydrogen sulfide, as described in U. S. Patent 2,076,875, or by sulfurizing the terpene and then subjecting the sulfurized terpene to catalytic hydrogenation over a sulfactive hydrogenation catalyst in accordance with the processes disclosed in more detail in copending applications of Fox Serial No. 440,253 and Werntz Serial No. 440,249, both filed April 23, 1942.

The polyvalent metal salts of the terpene mercaptans are preferably employed in an amount equal to from 0.05% to 5% of the weight of the elastomer. These compounds are effective in reducing the milling time of the elastomer at any temperature between 25° C. and 150° C., and they may be introduced into the elastomer and used in an internal mixer, as well as on a mill.

The salts of terpene mercaptans, such as sylvestrene, the menthenes, limonene, pseudolimonene, carvone, corene, the terpinenes, alpha and beta phellandrene, terpinolene, bornylene, selinene, menthadiene, farnesene, fenchene, irone and ionone mercaptans, may also be used for this purpose. The salts with other metals, such as titanium, tin, chromium, manganese, iron, cobalt and antimony may also be used.

The butadiene-styrene elastomer may be one containing from 5% to 60% of styrene.

I claim:

1. A method for improving the processing characteristics of butadiene-styrene interpolymers containing from 5% to 60% of styrene, which comprises intimately incorporating in said interpolymer from 0.5% to 5.0%, based on the weight of the interpolymer, of a polyvalent metal salt of a terpene mercaptan.

2. A method for improving the processing characteristics of butadiene-styrene interpolymers containing from 5% to 60% of styrene, which comprises intimately incorporating in said interpolymer from 0.5% to 5.0%, based on the weight of the interpolymer, of the zinc salt of a terpene mercaptan.

3. A method for improving the processing characteristics of butadiene-styrene interpolymers containing from 5% to 60% of styrene, which comprises intimately incorporating in said interpolymer from 0.5% to 5.0%, based on the weight of the interpolymer, of the zinc salt of pinene mercaptan.

4. A butadiene-styrene interpolymer containing from 5% to 60% of styrene having incorporated therein from 0.5% to 5.0%, based on the weight of the interpolymer, of a polyvalent metal salt of a terpene mercaptan.

5. A butadiene-styrene interpolymer containing from 5% to 60% of styrene having incorporated therein from 0.5% to 5.0%, based on the weight of the interpolymer, of the zinc salt of a terpene mercaptan.

6. A butadiene-styrene interpolymer containing from 5% to 60% of styrene having incorporated therein from 0.5% to 5.0%, based on the weight of the interpolymer, of the zinc salt of pinene mercaptan.

JOHN R. VINCENT.